United States Patent
Tranchepain et al.

(10) Patent No.: US 12,449,340 B2
(45) Date of Patent: Oct. 21, 2025

(54) METHOD FOR EVALUATING RHEOLOGICAL PROPERTIES OF A GEL

(71) Applicant: LABORATOIRES VIVACY, Paris (FR)

(72) Inventors: Frederic Tranchepain, Villy le Bouveret (FR); Florence Brunel, Annemasse (FR); Virginie Bigand, Pringy (FR); Sandra Vincent, Presilly (FR)

(73) Assignee: LABORATOIRES VIVACY, Paris (FR)

( * ) Notice: Subject to any disclaimer, the term of this patent is extended or adjusted under 35 U.S.C. 154(b) by 266 days.

(21) Appl. No.: 18/022,344

(22) PCT Filed: Aug. 17, 2021

(86) PCT No.: PCT/EP2021/072864
§ 371 (c)(1),
(2) Date: Apr. 20, 2023

(87) PCT Pub. No.: WO2022/038156
PCT Pub. Date: Feb. 24, 2022

(65) Prior Publication Data
US 2023/0358660 A1    Nov. 9, 2023

(30) Foreign Application Priority Data
Aug. 20, 2020  (FR) ..................... 2008590

(51) Int. Cl.
*G01N 11/16*    (2006.01)
*G01N 11/00*    (2006.01)

(52) U.S. Cl.
CPC .... *G01N 11/162* (2013.01); *G01N 2011/0026* (2013.01)

(58) Field of Classification Search
CPC ......... G01N 11/162; G01N 2011/0026; G01N 11/16; G01N 11/165; A61K 2800/91;
(Continued)

(56) References Cited

U.S. PATENT DOCUMENTS

2006/0194758 A1    8/2006   Lebreton
2010/0303873 A1    12/2010  Piron et al.

FOREIGN PATENT DOCUMENTS

EP    2 231 108 B1    4/2015
EP    3 274 685 B1    10/2019
(Continued)

OTHER PUBLICATIONS

Dec. 13, 2021 International Search Report issued in International Patent Application No. PCT/EP2021/072864.
(Continued)

*Primary Examiner* — Robert R Raevis
(74) *Attorney, Agent, or Firm* — Oliff PLC

(57) ABSTRACT

A method for evaluating the rheological properties of at least one gel, consisting in determining the extent of the plastic domain in stress $\zeta_c-\zeta_p$, and in strain $\gamma_c-\gamma_p$, the determination being carried out according to the steps: subjecting at least one sample of at least one gel to oscillating mechanical stresses at a fixed frequency, determining and plotting curves of the elastic modulus G' and the viscous modulus G" as a function of the strain and stress, determining $\zeta_c$ and $\gamma_c$ at the point of intersection $X_c$ of the curves of G' and G" under stress and strain, determining $\zeta_p$ and $\gamma_p$ by fixing an arbitrary value of G' (G'x) that is defined as the entry value into the plastic domain, and calculating $\zeta_c-\zeta_p$ and $\gamma_c-\gamma_p$.

11 Claims, 9 Drawing Sheets

(58) Field of Classification Search
CPC ...... A61K 8/735; A61K 8/042; A61Q 19/001; A61Q 19/00
USPC .............................................. 73/54.41, 64.41
See application file for complete search history.

(56) References Cited

FOREIGN PATENT DOCUMENTS

| FR | 2 983 483 A1 | 6/2013 |
|----|--------------|--------|
| WO | 00/46253 A1 | 8/2000 |
| WO | 2004/092222 A2 | 10/2004 |
| WO | 2009/071697 A1 | 6/2009 |
| WO | 2016/150974 A1 | 9/2016 |
| WO | 2017/162676 A1 | 9/2017 |
| WO | 2018/104426 A1 | 6/2018 |

OTHER PUBLICATIONS

Dec. 13, 2021 Written Opinion issued in International Patent Application No. PCT/EP2021/072864.
Jul. 6, 2021 Written Opinion issued in French Patent Application No. 2008590.
Faivre et al., "Advanced Concepts in Rheology for the Evaluation of Hyaluronic Acid-Based Soft Tissue Fillers", Advanced Concepts in Rheology, vol. 47, No. 5, May 2021, pp. e159-e167.
Apr. 13, 2022 International Preliminary Report on Patentability issued in International Patent Application No. PCT/EP2021/072864.

[Decimal commas in chart]

[Decimal commas in chart]

METHOD FOR EVALUATING RHEOLOGICAL PROPERTIES OF A GEL

The invention relates to a method for evaluating rheological properties of a gel, particularly of a hyaluronic acid-based hydrogel, that makes it possible in particular to differentiate comparable products in terms of use or recommendations for use.

Such gels can be hydrogels that are used as injectable gels in cosmetic surgery, gels that can be used in the field of joint treatments, or gels used in medical applications such as the healing of wounds, or even as devices for releasing and diffusing pharmaceutical active substances.

As part of the present application, a number of definitions are called to mind below.

According to the IUPAC (International Union of Pure and Applied Chemistry), gel is described as a nonfluid colloidal or polymer network that is expanded throughout its whole volume by a fluid.

Hydrogels are distinguished among the gels and are defined as polymer gels which are composed of a three-dimensional network consisting of at least one polymer that is capable of absorbing a large quantity of water or aqueous solution and which have particular rheological properties, particularly in terms of viscosity and viscoelasticity.

In a gel or a hydrogel, said network can be formed by chemical crosslinks through the creation of bonds between the polymer chains, it being possible for these bonds to be covalent bonds. Said network can also be obtained by transient physical interactions in the form of ionic, hydrophobic, or hydrogen bonds, for example.

Rheological characteristics or rheological properties are the physical features that make it possible to study the deformation and flow of the material under the application of stress.

Noteworthy rheological properties that are determined for hydrogels include the elastic modulus G' and the viscous modulus G". These data are obtained by subjecting a sample to a low-amplitude fixed-distortion frequency sweep (in the linear domain), which is a method that is well known to those skilled in the art.

However, these frequency sweeps are comparable to photographs of the networks that are taken statically and are not sufficient to enable the prediction and/or determination of the dynamic behavior of the gels under different in-vivo stresses or strains and to differentiate and compare products.

However, the evaluation of the rheological properties of a gel is essential during the development of products, because it makes it possible to limit the number of tests in the laboratory aimed at evaluating the performance of the gels and to make choices without having to systematically resort to in vivo tests.

In addition, the evaluation of the rheological properties of a gel makes it possible to facilitate the development of new types of gels and to work on the properties of the gel in order to obtain the desired result according to different applications.

In the prior art, methods for evaluating the rheological properties of injectable gels complimenting the determination of the elastic G' and viscous G" moduli have been described.

For example, patent EP3274685B1, under the name of Teoxane, discloses a method for evaluating the rheological properties of an injectable gel. This process involves measuring the area under the curve for G' between two measurement limits determined arbitrarily beforehand in order to give an indication of the mechanical resistance of the gel, i.e., of the capacity of the gel to maintain its structure over a wide spectrum of values. This integral score is a physical quantity analogous to an energy. However, in order to differentiate between two gels having a similar "integral score," said score being dependent on the choice of integration limits and of the integration method, another parameter must be measured in addition. This is the "creep measurement," which is a quantity that is associated with the elastic and viscous deformation immediately or over time. According to this same application, this quantity is linked to the "slope of the creep," which is calculated as the ratio between the imposed stress and the viscosity of the gel, and which is homogeneous at $s^{-1}$.

As illustrated in FIG. 15, the present invention differs from the method disclosed in patent application WO2016/150974 or in patent EP3274685B1, The present invention is distinguished in that it involves the study of physical parameters that are different from those specified in patent application WO2016/150974 or in patent EP3274685B1 for the purpose of differentiating and/or comparing two distinct gels. What is more, the present invention makes it possible to directly measure and study the behavior of the hydrogel subjected to stresses and/or strains in the plastic domain by determining the resistance range, said resistance range being defined by the difference $\zeta_c - \zeta_p$, i.e., the extent of the plastic domain in stress and of the malleability range, said malleability range being defined by the difference $\gamma_c - \gamma_p$, i.e., the extent of the plastic domain in strain.

Patent application WO2018/104426 in the name of Nestlé Skin Health discloses a method for evaluating the rheological properties of an injectable gel. This process is based on the measurement of a parameter referred to as flexibility. This physical parameter is evaluated by measuring the stress at the point of intersection of the amplitude sweep between the elastic modulus G' and the viscous modulus G".

These methods thus make it possible to complete the conventional measurements of elasticity/rigidity and viscosity, but they do not allow for the measurement and study of the behavior of hydrogel subjected to stresses and/or strains in the plastic domain.

The present invention makes it possible to measure and study the behavior of the hydrogel subjected to stresses and/or strains in the plastic domain and consists of a method for evaluating the rheological properties of at least one gel, consisting in determining the resistance range, said resistance range being defined by the difference $\zeta_c - \zeta_p$, i.e., the extent of the plastic domain in stress, and the malleability range, said malleability range being defined by the difference $\gamma_c - \gamma_p$, i.e., the extent of the plastic domain in strain.

FIG. 1 is a schematic representation of the evolution of the viscous and elastic moduli of a gel sample subjected to a strain and/or stress sweep and of the linearity domains denoted LI, plastic domains denoted PL, and spread domains denoted ET.

The elastic modulus G' is an intrinsic quantity of a material—gel in this case—defined by the ratio of stress to elastic strain. The elastic modulus is expressed in Pascal.

The viscous modulus G" or loss modulus is a physical quantity that characterizes the viscous behavior linked to the capacity for dissipating elastic stress. The viscous modulus is expressed in Pascal.

The ratio of viscous modulus to elastic modulus is defined as the mechanical loss factor, denoted tan δ.

Strain sweeping allows for the dynamic study of G' and G" as a function of strain for a fixed oscillation frequency.

Stress sweeping allows for the dynamic study of G' and G" as a function of stress for a fixed frequency.

As illustrated in FIG. 1, the linearity domain is the domain in which the gel is not affected by stress, it being considered to be at rest, meaning that G' is considered as a constant. This domain, denoted LI in the diagram, corresponds to the domain delimited by the original value of the abscissa axis and the value P on the abscissa axis.

The spread domain is the domain in which the gel exhibits complete network breakdown. As illustrated in FIG. 1, this domain, denoted ET in the diagram, corresponds to the domain beyond the value C on the abscissa axis.

The plastic domain is the domain in which the gel is malleable and exhibits rearrangements at the level of locally broken physical bonds.

As illustrated in FIG. 1, the start and end limits of the plastic domain, denoted PL in the diagram, are respectively represented by the points P and C on the abscissa axis and this domain.

The point P is arbitrarily determined when the value of the elastic modulus G' has decreased by x %.

As illustrated in FIG. 1, its value is determined on the abscissa axis when G' is equal to G'p.

As shown in FIG. 1, point C represents the abscissa value at the point of intersection of the curves of G' and G" at a fixed oscillation frequency. This point of intersection is denoted Xc in FIG. 1.

During the stress sweep, the points P and C represented in FIG. 1 denote the variables and $\partial_c$ and $\zeta_p$, respectively, expressed in Pascal.

During the strain sweep, the points P and C represented in FIG. 1 designate the variables $\gamma_p$ and $\gamma_c$, respectively. These variables are expressed in % strain and are dimensionless.

The resistance range can be defined as the interval of forces that can be applied to the gel to deform it without permanently destructuring it. Beyond this range, the gel has lost its integrity. It will be determined by the extent of the plastic domain in stress, namely by the value of the difference between $\zeta_c$ and $\zeta_p$.

This resistance range makes it possible to quantify the resistance of the gel to stresses and forces to which it is subjected in vivo, for example in moving lips or in a joint. It will make it possible to assess the ability of the gel to fracture and separate under external pressure.

The malleability range can be defined as the ability of the gel to deform and be molded while retaining its initial rheological properties. This is determined by the extent of the plastic domain in strain, namely by the value of the difference between $\gamma_c$ and $\gamma_p$.

The malleability range will make it possible to appreciate the adaptation and the possibility of responding to the dynamics and movements of the surrounding tissues. It will also make it possible to predict the ability of the product to be "shaped" according to need and indication.

The present invention is a method for evaluating the rheological properties of at least one gel, consisting in determining the extent of the plastic domain in stress $\zeta_c-\zeta_p$ and in strain $\gamma_c-\gamma_p$, the determination being carried out according to the steps of:

subjecting at least one sample of at least one gel to oscillatory mechanical stresses at a fixed frequency, determining and plotting the curves of the elastic modulus G' and of the viscous modulus G" as a function of the strain and of the stress, determining $\zeta_c$ and $\gamma_c$ at the point of intersection ($X_c$) of the curves G' and G" under stress and strain, determining $\zeta_p$ and $\gamma_p$ by fixing an arbitrary value of G' (G'p) that is defined as the entry value into the plastic domain, and calculating $\zeta_c-\zeta_p$ and $\gamma_c-\gamma_p$.

In one embodiment, the oscillatory mechanical stresses are implemented by an amplitude sweep.

In one embodiment, amplitude sweep refers to both strain sweep and stress sweep.

In one embodiment, the arbitrary value of G' is defined as the value for which the elastic modulus G' has decreased by at most 15% compared to the value of G' at the plateau of the linear domain, denoted G'p.

The minimum percentage reduction in the elastic modulus G' depends on the sensitivity of the measurements performed, which is less than or equal to 5%.

In one embodiment, the arbitrary value of G' is defined as the value for which the elastic modulus G' has decreased from 5 to 15% relative to the value of G' at the plateau of the linear domain, denoted G'p.

In one embodiment, the arbitrary value of G' is defined as the value for which the elastic modulus G' has decreased from 5 to 10% relative to the value of G' at the plateau of the linear domain, denoted G'p.

In one embodiment, the arbitrary value of G' is defined as the value for which the elastic modulus G' has decreased by 5% compared to the value of G' at the plateau of the linear domain, denoted G'p in stress and in strain.

In one embodiment, the arbitrary value of G' is defined as the value for which the elastic modulus G' has decreased by 7.5% relative to the value of G' at the plateau of the linear domain, denoted G'p in stress and in strain.

In a preferred embodiment, the arbitrary value of G' is defined as the value for which the elastic modulus G' has decreased by 10% relative to the value of G' at the plateau of the linear domain, denoted G'p in stress and in strain.

In one embodiment, the fixed frequency during the strain sweep and/or stress sweep is between 0.1 and 10 Hz.

In one embodiment, the fixed frequency during the strain sweep and/or stress sweep is between 0.5 and 5 Hz.

In one embodiment, the fixed frequency during the strain sweep and/or stress sweep is between 0.1 and 5 Hz.

In one embodiment, the fixed frequency during the strain sweep and/or stress sweep is between 0.1 and 3 Hz.

In one embodiment, the fixed frequency during the strain sweep and/or stress sweep is between 0.5 and 3 Hz.

In one embodiment, the fixed frequency during the strain sweep and stress sweep is between 0.7 and 2.5 Hz.

In one embodiment, the fixed frequency during the strain sweep and/or stress sweep is equal to 0.1 Hz.

In one embodiment, the fixed frequency during the strain sweep and/or stress sweep is equal to 0.5 Hz.

In one embodiment, the fixed frequency during the strain sweep and/or stress sweep is equal to 0.7 Hz.

In one embodiment, the fixed frequency during the strain sweep and/or stress sweep is equal to 1 Hz.

In one embodiment, the fixed frequency during the strain sweep and/or stress sweep is equal to 2.5 Hz.

In one embodiment, the fixed frequency during the strain sweep and stress sweep is equal to 3 Hz.

In one embodiment, the fixed frequency during the strain sweep and/or stress sweep is equal to 5 Hz.

In one embodiment, the sample whose rheological properties are studied by applying the method is a gel.

In one embodiment, said gel is selected from the group comprising hydrogels, silicone gels (for example a polydimethylsiloxane gel), acrylic gels (for example from polymethyl methacrylate particles), polyacrylamide gels.

In one embodiment, the gel whose rheological properties are studied by applying the method according to the invention is a hydrogel.

In one embodiment, said hydrogel is selected from the group comprising: polysaccharides, polyacrylamides, polyvinyl alcohol, polylactic acid, polyglycolic acid, polylactic-co-glycolic acids), poloxamers, polyethylene glycol, poly (N-isopropylacrylamide), gelatin and collagen, alone or as a mixture.

In one embodiment, said hydrogel is selected from the group of polysaccharides comprising: dextran, cellulose, starch and modified starches, cyclodextrins and derivatives thereof, cellulose derivatives (particularly hydroxypropyl cellulose, hydroxypropylmethyl cellulose, ethylmethyl cellulose, carboxymethyl cellulose), alginic acid, xanthan, carrageenan, chitosan, agarose, pectin, glycosaminoglycans (GAG) and biologically acceptable salts thereof, alone or as a mixture.

In one embodiment, said polysaccharide is selected from the group of the glycosaminoglycans (GAGS), such as, for example, chondroitin, keratan, heparin, heparosan or even hyaluronic add, and biologically acceptable salts thereof, alone or in mixture.

In one embodiment, said polysaccharide is hyaluronic add, or one of the biologically acceptable salts thereof, alone or as a mixture.

In one embodiment, said polysaccharide is hyaluronic acid.

In one embodiment, said polysaccharide is hyaluronic acid or a salt thereof, alone or as a mixture.

In one embodiment, said polysaccharide is hyaluronic acid in the form of sodium or potassium salt.

In one embodiment, said polysaccharide is hyaluronic acid in the form of sodium salt.

In one embodiment, said polysaccharide is crosslinked hyaluronic acid or a salt thereof, alone or as a mixture.

In one embodiment, said polysaccharide is crosslinked hyaluronic acid or a salt thereof, alone or as a mixture, said crosslinking being carried out by means of at least one crosslinking agent.

In one embodiment, said polysaccharide is crosslinked hyaluronic acid or a salt thereof, alone or as a mixture, said crosslinking being carried out by means of at least one bi- or polyfunctional crosslinking agent.

In one embodiment, said at least one crosslinking agent is selected from the group consisting of ethylene glycol diglycidyl ether, butanediol diglycidyl ether (BDDE), polyglycerol polyglycidyl ether, polyethylene glycol diglycidyl ether, polypropylene glycol diglycidyl ether, a bis- or polyepoxy such as 1,2,3,4-diepoxybutane or 1,2,7,8-diepoxyoctane, a dialkylsulfone, divinylsulfone, formaldehyde, epichlorohydrin or even glutaraldehyde, carbodiimides such as, for example, 1-ethyl-3-3-dimethylaminopropyl carbodiimide hydrochloride (EDC), trimetaphosphates, such as, for example, sodium trimetaphosphate, calcium trimetaphosphate, or even barium trimetaphosphate.

In one embodiment, said at least one crosslinking agent is selected from the group consisting of ethylene glycol diglycidyl ether, butanediol diglycidyl ether (BDDE), polyglycerol polyglycidyl ether, polyethylene glycol diglycidyl ether, polypropylene glycol diglycidyl ether, a bis- or polyepoxy such as 1,2,3,4-diepoxybutane or 1,2,7,8-diepoxyoctane, trimetaphosphates, such as, for example, sodium trimetaphosphate, calcium trimetaphosphate, or even barium trimetaphosphate.

In one embodiment, said polysaccharide is co-crosslinked hyaluronic add or a salt thereof, alone or as a mixture.

In one embodiment, said polysaccharide is crosslinked or non-crosslinked hyaluronic acid that has been chemically modified by substitution, or a salt thereof, alone or as a mixture.

In one embodiment, said polysaccharide is doubly crosslinked hyaluronic acid as described in patent application WO2000/046253 in the name of Fermentech Medical Limited.

In one embodiment, said polysaccharide is a mixture of crosslinked and non-crosslinked hyaluronic acids, or a salt thereof.

In one embodiment, said polysaccharide is a mixture of crosslinked hyaluronic acids, or a salt thereof.

In one embodiment, said polysaccharide is a mixture of crosslinked hyaluronic acids, or a salt thereof, such as that described in patent application WO2009/071697 in the applicant's name.

In one embodiment, said polysaccharide is a mixture of hyaluronic acids obtained by mixing a plurality of hyaluronic acids, or a salt thereof, of different molecular masses prior to crosslinking, as described in patent application WO2004092222 in the name of Corneal Industrie.

In one embodiment, said polysaccharide is hyaluronic acid, or a salt thereof, substituted by a group which imparts lipophilic or moisturizing properties, such as, for example, substituted hyaluronic acids as described in patent application FR2983483 in the applicant's name, That application describes a method for the simultaneous substitution and crosslinking of a polysaccharide via its hydroxyl functions, in the aqueous phase, characterized in that it comprises the following steps: (i) a polysaccharide is placed in an aqueous medium, (ii) it is placed in the presence of at least one precursor of a substituent, (iii) it is placed in the presence of a crosslinking agent, and (iv) the substituted and crosslinked polysaccharide is obtained and isolated.

In one embodiment, said polysaccharide is hyaluronic acid or a salt thereof, grafted with glycerol, for example as described in application WO2017162676 in the name of MERZ.

In one embodiment, said gel also comprises at least one active ingredient selected from the group consisting of local anesthetics, vitamin C derivatives, anti-inflammatories, polyols, and mixtures thereof.

In one embodiment, said gel further comprises at least one local anesthetic selected from the group consisting of lidocaine, mepivacaine, and mixtures thereof.

In one embodiment, the at least one local anesthetic is present at a local anesthetic concentration of between 0.1 and 5% relative to the total mass of said gel.

In one embodiment, said gel further comprises at least one anti-inflammatory selected from the group consisting of steroidal and non-steroidal anti-inflammatories.

In one embodiment, said at least one anti-inflammatory is selected from the group consisting of the steroidal anti-inflammatories (such as, for example, dexamethasone, prednisolone, corticosterone, budesonide, sulfasalazine, mesalamine, cetirizine, diphenhydramine, antipyrine, methyl salicylate, loratadine, thymol, carvacrol, bisabolol, allantoin, eucalyptol, phenazone (antipyrine), propyphenazone) and nonsteroidals (such as ibuprofen, naproxen, fenoprofen, ketoprofen, flurbiprofen, oxaprozin, indomethacin, sulindac, etodolac, ketorolac, diclofenac, nabumetone, piroxicam, meloxicam, tenoxicam, droxicam, lornoxicam, isoxicam, mefenamic acid, meclofenamic acid, flufenamic acid, tolfenamic acid, celecoxib, rofecoxib, valdecoxib, parecoxib, lumiracoxib, etoricoxib, firocoxib, sucrose octasulfate, and/or salts thereof).

In one embodiment, the method for preparing a formulation comprising at least one crosslinked polymer obtained according to the method of the invention further comprises at least one step of adding at least one polyol selected from the group consisting of mannitol, sorbitol, glycerol, maltitol, lactitol, and erythritol.

In one embodiment, said gel further comprises at least one polyol selected from the group consisting of mannitol, sorbitol, and glycerol.

In one embodiment, the at least one polyol is present at a polyol concentration of between 0.1 mg/mL and 50 mg/mL relative to the total mass of said gel.

In one embodiment, the molecular weight Mw of the at least one hyaluronic acid before crosslinking is within the range from 0.01 MDa to 5 MDa.

In one embodiment, the molecular weight Mw of the at least one hyaluronic acid before crosslinking is within the range from 0.1 MDa to 3.5 MDa.

In one embodiment, the molecular weight Mw of the at least one hyaluronic acid before crosslinking is within the range from 1 MDa to 3 MDa.

In one embodiment, the molecular mass Mw of the at least one hyaluronic acid before crosslinking is 1 MDa.

In one embodiment, the molecular mass Mw of the at least one hyaluronic acid before crosslinking is 3 MDa.

In one embodiment, the concentration of hyaluronic acid HA is between 2 mg/g and 50 mg/g of the total weight of said hydrogel.

In one embodiment, the concentration of hyaluronic acid HA is between 4 mg/g and 40 mg/g of the total weight of said hydrogel.

In one embodiment, the concentration of hyaluronic acid HA is between 5 mg/g and 30 mg/g of the total weight of said hydrogel.

In one embodiment, the concentration of hyaluronic acid HA is between 10 mg/g and 30 mg/g of the total weight of said hydrogel.

In one embodiment, the concentration of hyaluronic acid HA is 20 mg/g of the total weight of said hydrogel.

The applications of the gels whose rheological properties are studied by applying the method according to the invention are applications aimed at creating volumes, applying mechanical stresses, and creating physiological barriers.

Among the applications targeted, medical applications are of particular interest, some noteworthy examples being injections for replacing deficient biological fluids, for example in the joints for the purpose of replacing synovial fluid, postoperative injection for preventing peritoneal adhesions, periurethral injections for treating incontinence, and postoperative injections for presbyopia. Noteworthy examples of aesthetic applications are injections for filling wrinkles, fine lines, and skin defects, or for increasing volumes, for example of the lips, cheekbones, etc.

The targeted applications are more particularly the widely used applications in the context of injectable viscoelastics and polysaccharides that are or can be potentially used in the following pathologies or treatments:

aesthetic injections in the face: filling in wrinkles, skin or volume-related defects (cheekbones, chin, lips);
volumizing injections in the body: calf augmentation, breast and buttock augmentation, G-spot augmentation, vaginoplasty, vaginolabial reconstruction, penis enlargement;
in joint surgery and dental surgery for filling periodontal pockets, for example;
treatment of osteoarthritis, injection into the joint in order to replace or supplement deficient synovial fluid;
periurethral injection for the treatment of urinary incontinence due to sphincter insufficiency;
post-surgical injection in order to prevent peritoneal adhesions in particular;
injection following presbyopia surgery using laser scleral incisions;
injection into the vitreous cavity;
injection during cataract surgery;
injection for the treatment of cases of vaginal dryness;
injection into the genitals.
for filling fine, medium, or deep wrinkles, and injection using small-diameter needles (27 gauge, for example);
as a volumizer with injection by needles of larger diameter, from 22 to 26 gauge, for example, and longer (30 to 40 mm, for example); in that case, its cohesive nature will ensure its retention at the injection site.

These exemplary uses are in no way limiting, since the gels studied according to the method of the invention have numerous applications, examples of which include:
filling volumes;
generating spaces within certain tissues, thereby promoting optimal functioning thereof;
replacing deficient physiological fluids.

The present invention also includes a method for comparing and differentiating gels, comprising the steps of:
determining, according to the method of the invention described above, the resistance range of gels, said resistance range being defined by the difference $\zeta_c-\zeta_p$, i.e., the extent of the plastic domain in stress,
determining, according to the method of the invention described above, the malleability range of gels, said malleability range being defined by the difference $\gamma_c-\gamma_p$, i.e., the extent of the plastic domain in strain,
using resistance range and malleability range values to compare and differentiate gels.

In one embodiment, in combination with using the resistance range and malleability range values, the method of comparison includes using values for the elastic modulus G', viscous modulus G", delta ($\delta$), and tangent $\delta$.

In one embodiment, the method for comparing hydrogels makes it possible to compare a complete range of hydrogels from the same manufacturer based on one or more of the parameters defined above.

In one embodiment, the method for comparing hydrogels makes it possible to compare a range of filling gels from the same manufacturer based on one or more of the parameters defined above.

In one embodiment, the method for comparing hydrogels makes it possible to compare a range of facial volumizing gels from the same manufacturer based on one or more of the parameters defined above.

In one embodiment, the method for comparing hydrogels makes it possible to compare a complete range of hydrogels from different manufacturers based on one or more of the parameters defined above.

In one embodiment, the method for comparing hydrogels makes it possible to compare a range of filler gels from different manufacturers based on one or more of the parameters defined above.

In one embodiment, the method for comparing hydrogels makes it possible to compare a range of facial volumizing gels from different manufacturers based on one or more of the parameters defined above.

FIGURES

Figure 7:
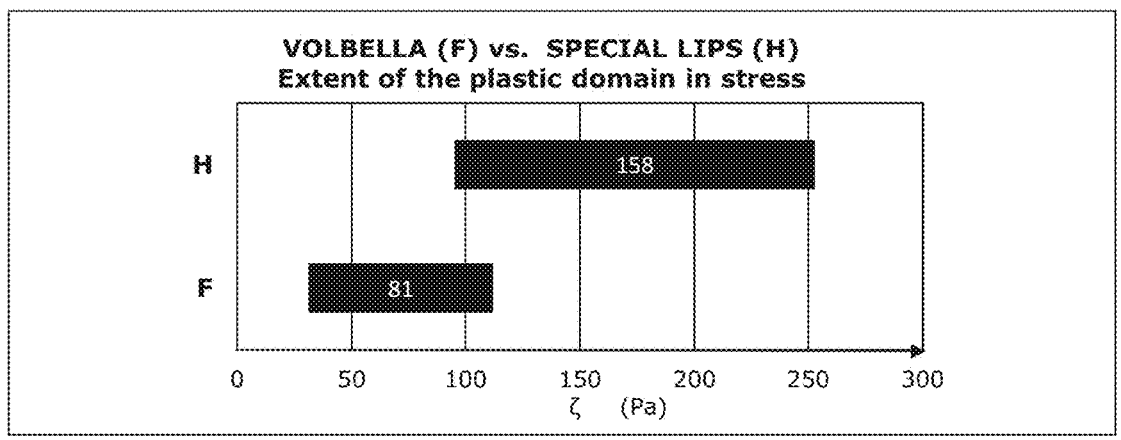
Figure 10:
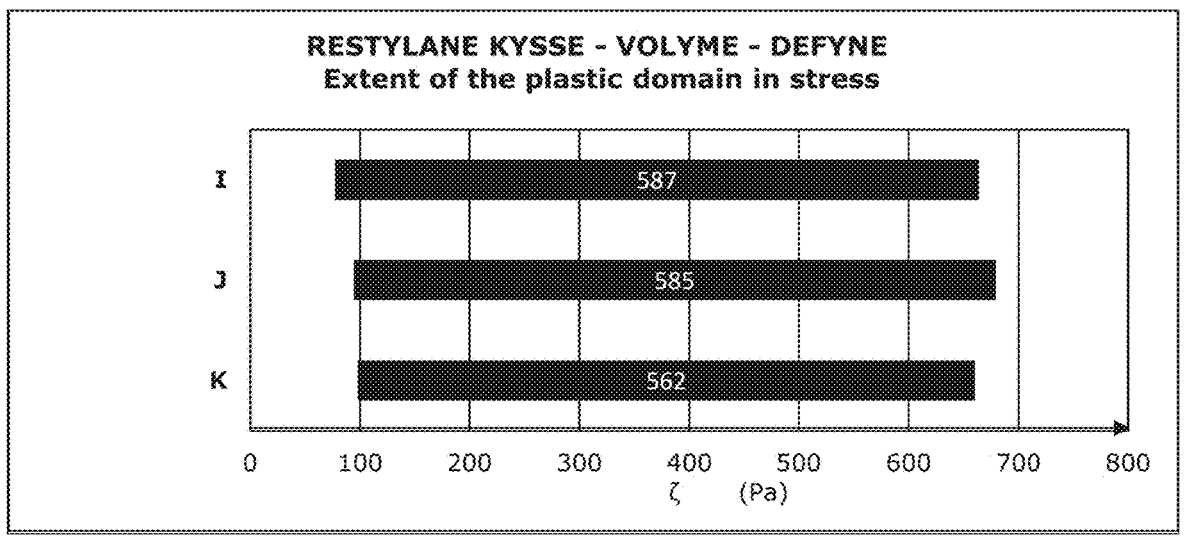
Figure 13:
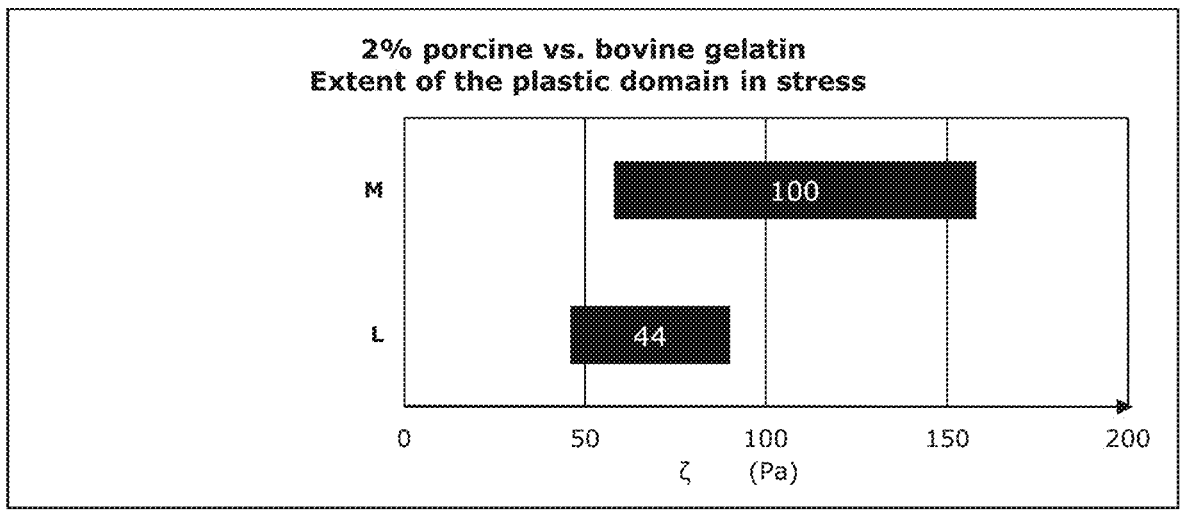

FIG. 7, FIG. 10, and FIG. 13 are representations of the extent of the plastic domain in stress of different formulas with abscissa $\zeta$ in Pa and ordinates for the different gels studied.

Figure 8:
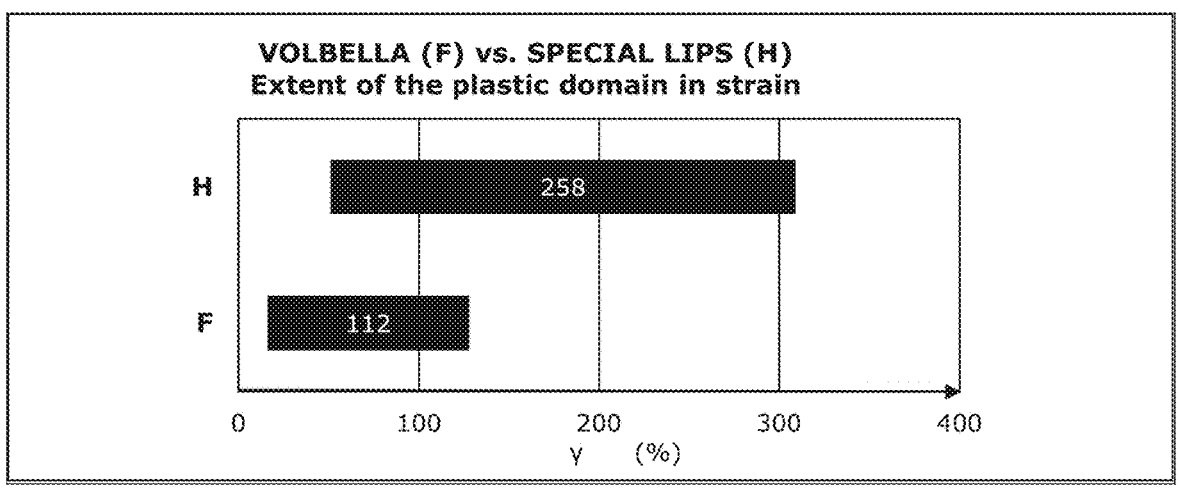
Figure 11:
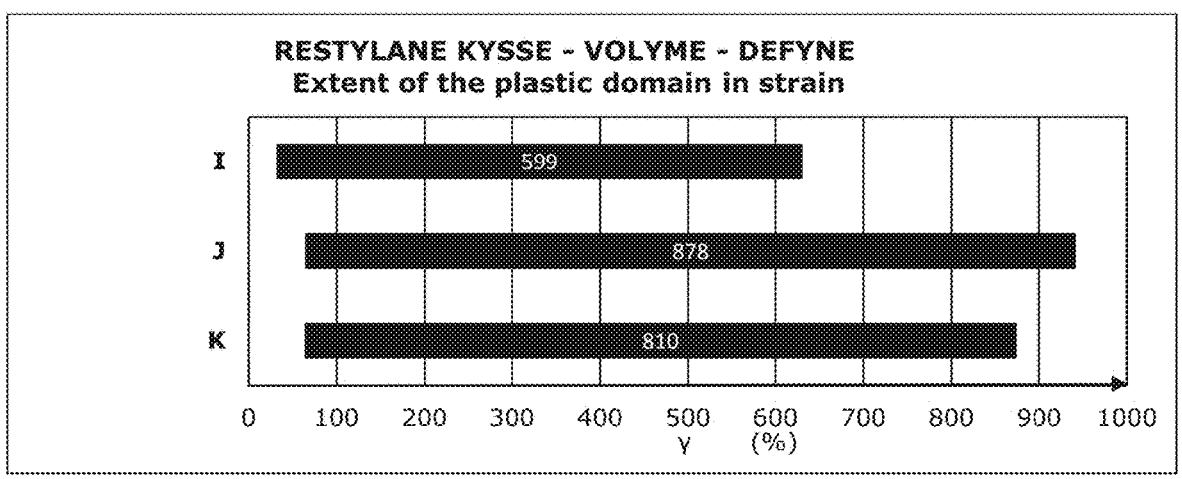
Figure 14:
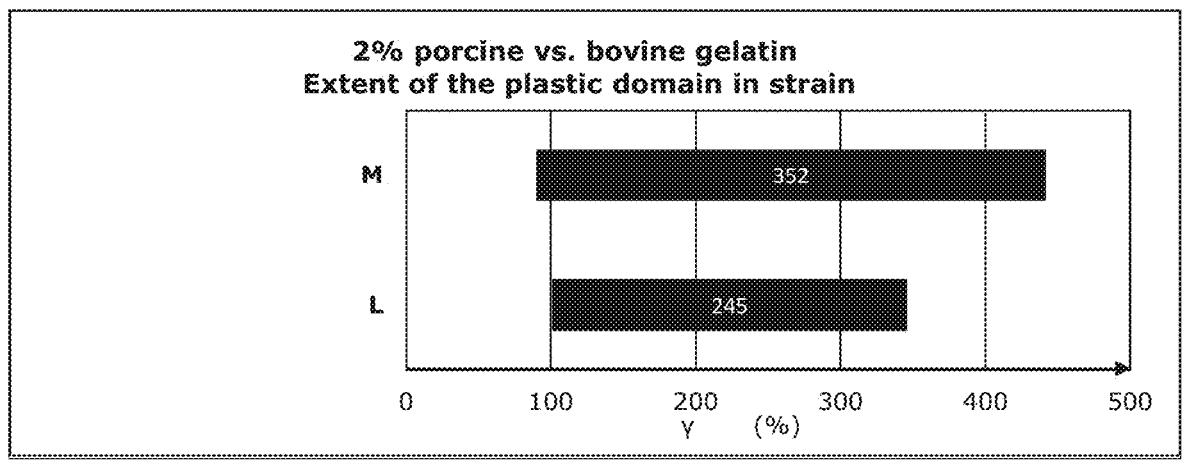

FIG. 8, FIG. 11, and FIG. 14 are representations of the extent of the plastic domain in strain of different formulas with abscissa $\gamma$ in (%) and ordinate for the different gels studied.

Figure 6:
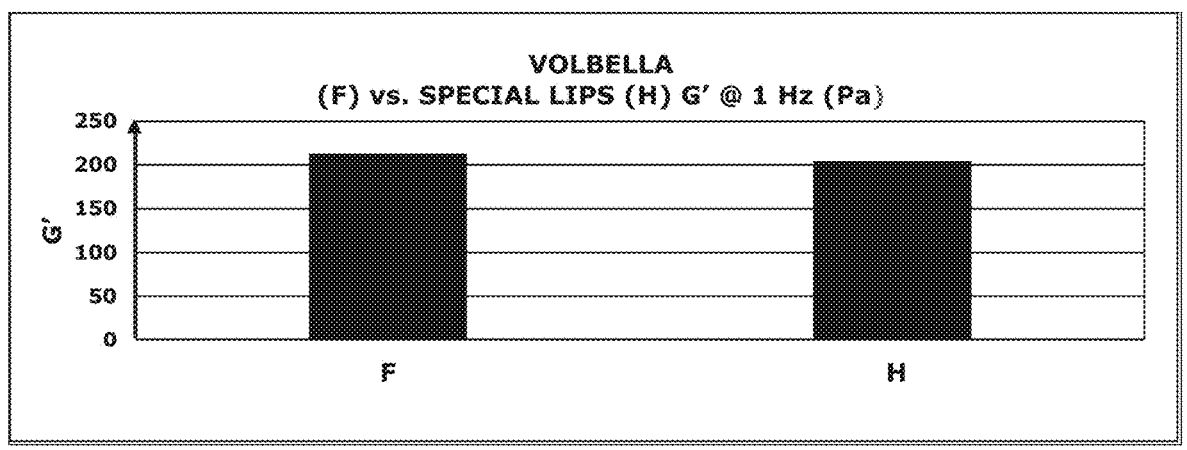
Figure 9:
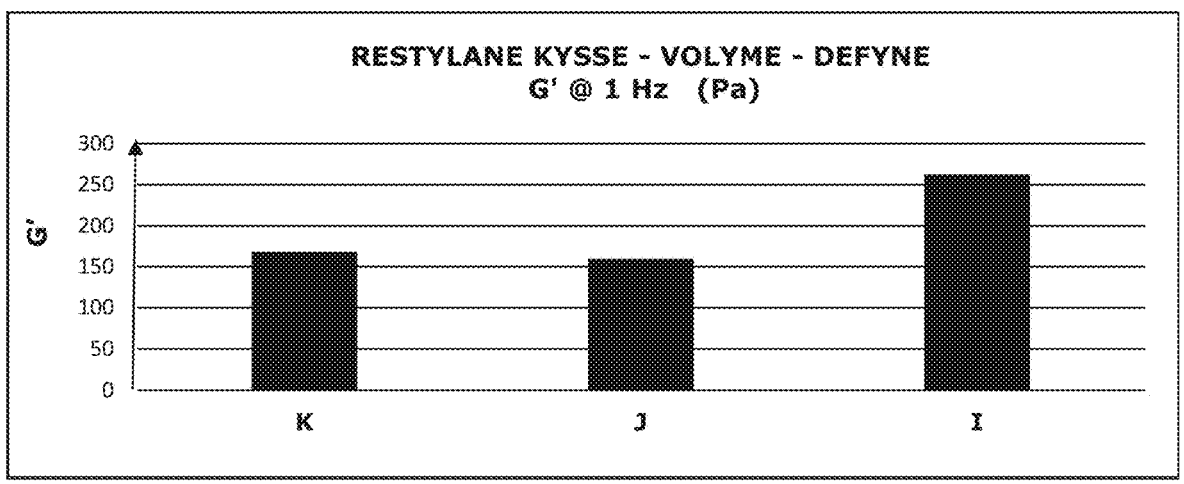
Figure 12:
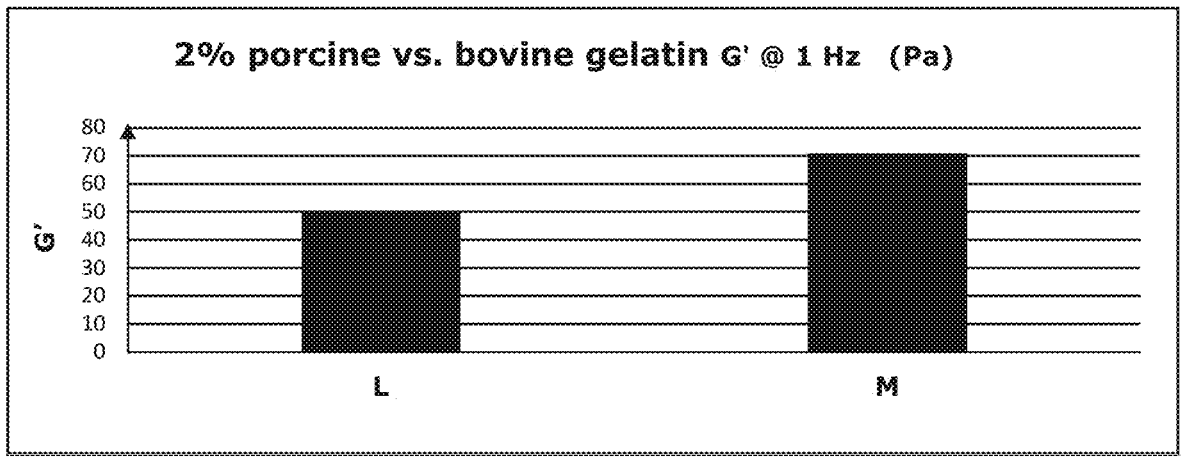

FIG. 6, FIG. 9, and FIG. 12 are representations of the elastic moduli G' in Pa at 1 Hz of different products.

Figure 15:
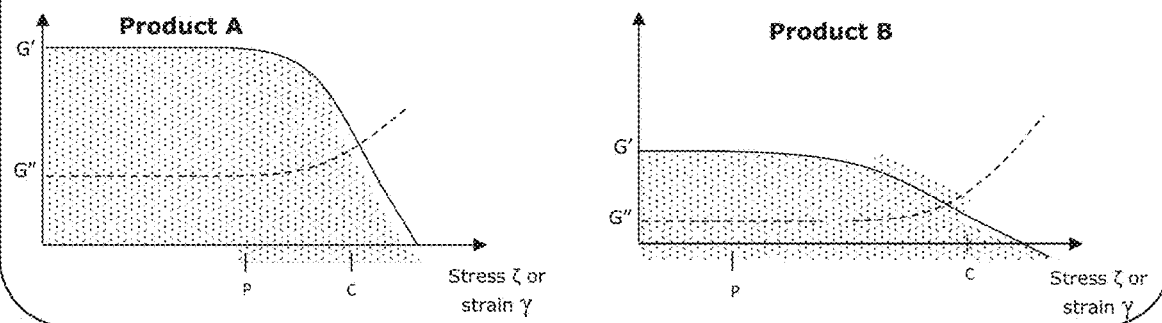
Figure 15:
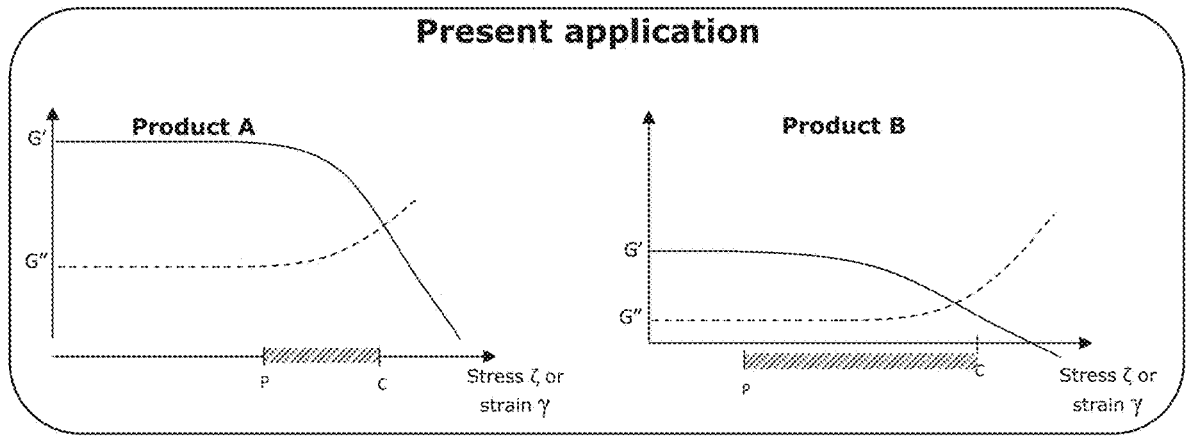

FIG. 15 is a representation of the differences between the method disclosed in patent application WO2016/150974 or in patent EP3274685B1 and the method according to the present invention.

EXAMPLES

The measurements are performed on the DHR-2 rotational shear rheometer (TA Instruments) using a 2° 40 mm cone-plane geometry at 25° C.

The viscoelastic parameters are evaluated by means of a strain sweep performed from 0.1 to 1000% strain at a frequency of 1 Hz. The value of the elastic and viscous moduli G' and G" at frequency 1 Hz corresponds to that of the elastic and viscous moduli in the linear domain.

For all of the examples, G'p is the value of G" for which the elastic modulus has decreased by 10% relative to the value of G' at the plateau of the linear domain.

Example 1

Table 1 below shows the rheological parameters of a non-crosslinked hyaluronic acid gel measured according to the method of the invention.

TABLE 1

| Product | G' @ 1 Hz (Pa) | G" @ 1 Hz (Pa) | tanδ @ 1 Hz | $\gamma_p$ (%) | $\zeta_p$ (Pa) | $\gamma_c$ (%) | $\zeta_c$ (Pa) | $\gamma_c - \gamma_p$ (%) | $\zeta_c - \zeta_p$ (Pa) |
|---|---|---|---|---|---|---|---|---|---|
| A | 1100 | 319 | 0.29 | 36 | 375 | 192 | 813 | 156 | 439 |
| B | 788 | 344 | 0.44 | 40 | 322 | 230 | 863 | 190 | 541 |

This non-crosslinked hyaluronic acid gel was prepared by dissolving sodium hyaluronate with a molecular mass of 3 MDa in PBS buffer at a concentration of 30 mg/mL.

The method according to the invention made it possible to evaluate the rheological parameters of the gel before and after the step of sterilizing the gel.

In the context of this example, the gel before the sterilization step is denoted A, and the gel after the sterilization step is denoted B.

In the above table, a variation in the rheological parameters is observed during the hyaluronic acid gel sterilization step.

There is an increase in the malleability range and a decrease in the resistance range during this sterilization step.

Example 2

The table below presents the rheological parameters of a KartilageCross® gel (intra-articular injection) sold by Laboratoires Vivacy and measured according to the method of the invention.

TABLE 2

| Product | G' @ 1 Hz (Pa) | G" @ 1 Hz (Pa) | tanδ @ 1 Hz | $\gamma_p$ (%) | $\zeta_p$ (Pa) | $\gamma_c$ (%) | $\zeta_c$ (Pa) | $\gamma_c - \gamma_p$ (%) | $\zeta_c - \zeta_p$ (Pa) |
|---|---|---|---|---|---|---|---|---|---|
| C | 169.3 | 26.9 | 0.159 | 40 | 63 | 253 | 182 | 213 | 119 |

In the context of this example, the KartilageCross gel marketed by Laboratoires VIVACY is denoted C.

The method according to the invention made it possible to measure and evaluate the conventional rheological parameters of gel C such as the elastic modulus and the viscous modulus.

In addition, the method according to the invention made it possible to measure rheological parameters such as the malleability range and the resistance range of gel C.

These parameters make it possible, in particular, to complete the study of the behavior of gel C.

Example 3

Table 3 below presents the rheological parameters of two formulations of gel measured according to the method of the invention.

TABLE 3

| Steam sterilization | Product | G' @ 1 Hz (Pa) | G" @ 1 Hz (Pa) | $\gamma_p$ (%) | $\zeta_p$ (Pa) | $\gamma_c$ (%) | $\zeta_c$ (Pa) | $\gamma_c - \gamma_p$ (%) | $\zeta_c - \zeta_p$ (Pa) |
|---|---|---|---|---|---|---|---|---|---|
| No | D | 367 | 43 | 54 | 183 | 417 | 540 | 363 | 358 |
|  | E | 379 | 39 | 51 | 176 | 384 | 511 | 333 | 334 |
| $F_0$ = 9 min | D | 311 | 44 | 57 | 164 | 494 | 542 | 436 | 378 |
|  | E | 284 | 40 | 64 | 167 | 508 | 529 | 444 | 362 |
| $F_0$ = 20.5 min | D | 282 | 42 | 64 | 167 | 538 | 544 | 474 | 377 |
|  | E | 238 | 37 | 64 | 140 | 595 | 527 | 531 | 387 |
| $F_0$ = 46.5 min | D | 242 | 41 | 64 | 143 | 619 | 559 | 555 | 415 |
|  | E | 171 | 31 | 64 | 101 | 766 | 560 | 703 | 458 |

The first is a formulation produced according to the method described in patent EP2231108 with incorporation of mannitol (denoted D in the table above).

The second is a formulation produced according to the method in patent EP2231108 without incorporation of mannitol (denoted E in the table above).

The method according to the invention made it possible to evaluate the rheological parameters of these two formulations at different sterilization values $F_0$=9 min; $F_0$=20.5 min; and $F_0$=46.5 min.

As a reminder, the sterilization value is expressed in units of time and makes it possible to quantify the effect of a sterilizing treatment.

In the table above, it can be seen that the elastic modulus of formulations D and E decreases during the sterilization step.

Figure 1:
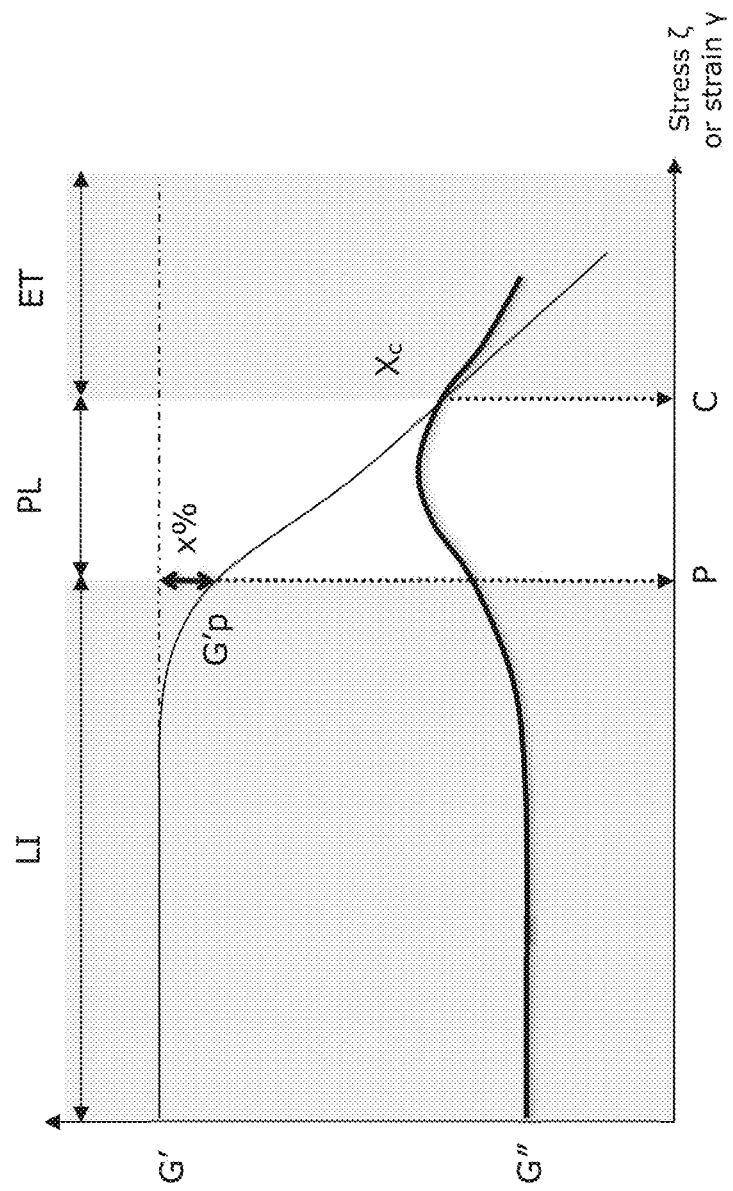
FIG. 1 is a schematic representation of the evolution of the viscous and elastic moduli of a gel sample subjected to a strain and/or stress sweep and of the linearity domains denoted LI, plastic domains denoted PL, and spread domains denoted ET.
Figure 2:
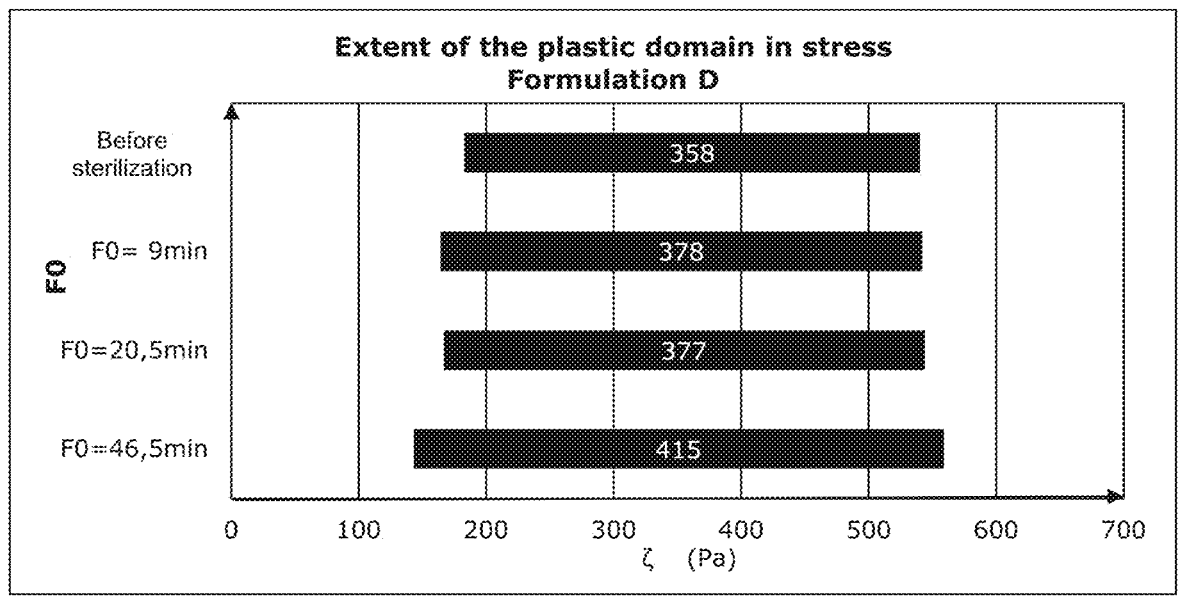
FIG. 2 and FIG. 3 are representations of the extent of the plastic domain in stress of different formulas with abscissa $\zeta$ in Pa and ordinates F0.
Figure 3:
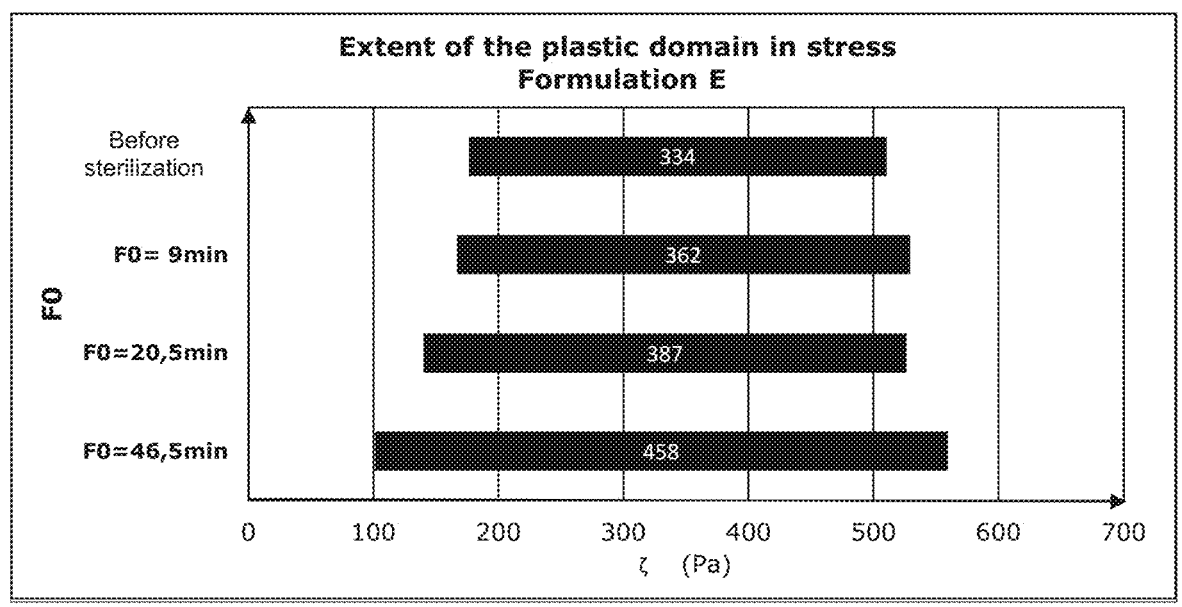

In contrast, as is shown in FIG. 2 and FIG. 3, the resistance range parameter increases upon sterilization of formulations D and E.

Figure 4:
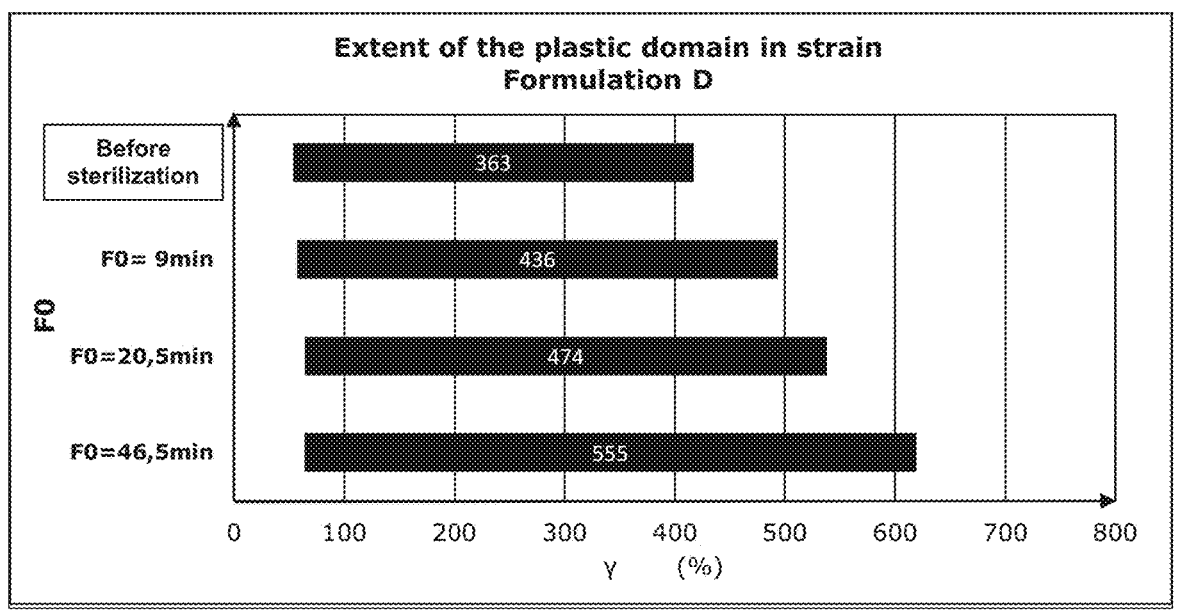
FIG. 4 and FIG. 5 are representations of the extent of the plastic domain in strain of different formulas with abscissa $\gamma$ in (%) and ordinate F0.
Figure 5:
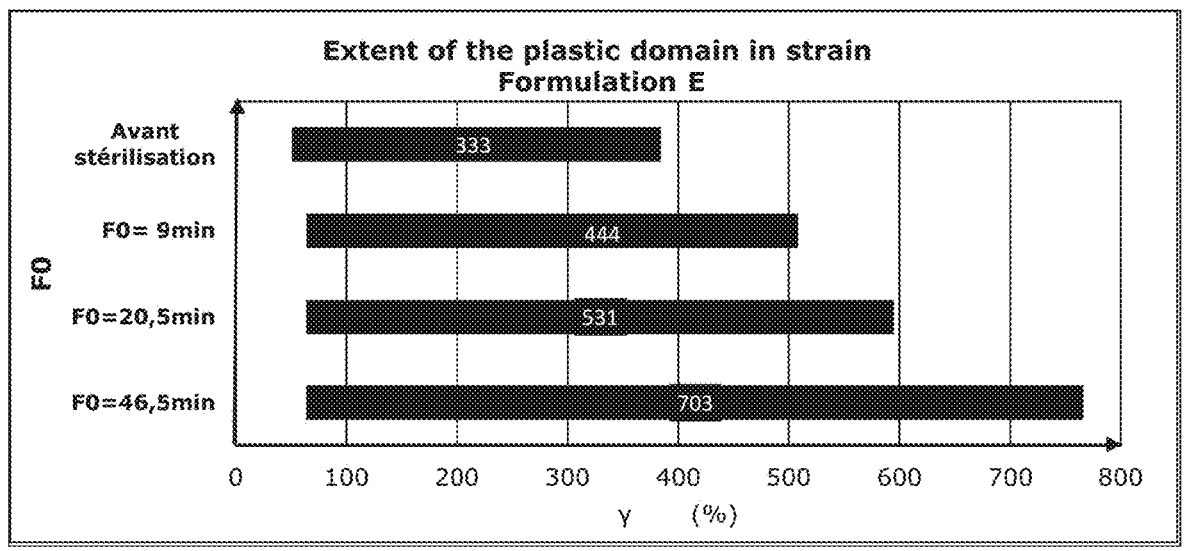

As shown in FIG. 4 and FIG. 5, the extent of the malleability range increases significantly during the process of the sterilization of formulations D and E.

Example 4

The table below presents the rheological parameters of two different gels measured according to the method of the invention.

TABLE 4

| Product | G' @ 1 Hz (Pa) | G" @ 1 Hz (Pa) | tanδ @ 1 Hz | $\gamma_p$ (%) | $\zeta_p$ (Pa) | $\gamma_c$ (%) | $\zeta_c$ (Pa) | $\gamma_c - \gamma_p$ (%) | $\zeta_c - \zeta_p$ (Pa) |
|---|---|---|---|---|---|---|---|---|---|
| F | 213 | 25 | 0.12 | 16 | 31 | 128 | 112 | 112 | 81 |
| H | 204 | 33 | 0.16 | 51 | 95 | 309 | 253 | 258 | 158 |

The first is the product Juvederm Volbella (with lidocaine) marketed by the company Allergan. In the context of this example, the product Volbella is denoted F.

The second is the product Special Lips from the Stylage range marketed by Laboratoires Vivacy. In the context of this example, the product Special Lips is denoted H.

As illustrated in FIG. 6, gels F and H have similar elastic moduli G'.

They also have similar viscous moduli G".

On the other hand, the extent of the resistance range and the malleability range distinguish the two products.

As shown in FIG. 7, the resistance range of product H is twice as extensive as that of product F, and it is also shifted translationally to higher values of ζ such that there is practically no overlap of the resistance ranges.

Also in FIG. 8, it can be seen that the malleability range of product H is twice as extensive as that of product F, and it is also shifted translationally toward higher values of ζ, but significant overlap of the resistance ranges is preserved.

In conclusion, the method according to the invention made it possible to differentiate between two gels with similar elastic and viscous moduli.

Example 5

The table below shows the rheological parameters of three different Restylane gels measured according to the method of the invention.

TABLE 5

| Product | G' @ 1 Hz (Pa) | G" @ 1 Hz (Pa) | Tanδ @ 1 Hz | $\gamma_p$ (%) | $\zeta_p$ (Pa) | $\gamma_c$ (%) | $\zeta_c$ (Pa) | $\zeta_c - \zeta_p$ (Pa) | $\gamma_c - \gamma_p$ (%) |
|---|---|---|---|---|---|---|---|---|---|
| I | 262.5 | 26.01 | 0.099 | 32 | 77 | 631 | 664 | 587 | 599 |
| J | 160 | 25 | 0.16 | 64 | 94 | 942 | 679 | 585 | 878 |
| K | 168 | 25 | 0.15 | 64 | 98 | 874 | 660 | 562 | 810 |

The first is the product Restylane Defyne marketed by the company Galderma. In the context of this example, the product Restylane Defyne is denoted I.

The second is the product Restylane Volyme marketed by the company Galderma. In the context of this example, the product Restylane Volyme is denoted 3.

The third is the product Restylane Kysse marketed by the Galderma company. In the context of this example, the Restylane Kysse product is denoted K.

As illustrated in FIG. 9, gels J and K have similar elastic moduli G', whereas the elastic modulus of gel I is different.

On the other hand, gels I, J, and K exhibit similar viscous moduli G".

As shown in FIG. 10, the resistance range of gels I and J is almost identical and is of the same order of magnitude for gel K.

As shown in FIG. 11, it is observed that the malleability range differs depending on the nature of products I, J, and K.

In the context of this example, the method according to the invention made it possible to differentiate between two gels with similar elastic and viscous moduli (J and K).

In conclusion, the method according to the invention made it possible to evaluate the rheological parameters of commercial gels and to differentiate between two gels with similar elastic and viscous moduli.

Example 6

The table below presents the rheological parameters of two different gels measured according to the method of the invention.

TABLE 6

| | G' @ 1 Hz (Pa) | G" @ 1 Hz (Pa) | $\gamma_p$ (%) | $\zeta_p$ (Pa) | $\gamma_c$ (%) | $\zeta_c$ (Pa) | $\gamma_c - \gamma_p$ (%) | $\zeta_c - \zeta_p$ (Pa) |
|---|---|---|---|---|---|---|---|---|
| L | 50 | 4 | 101 | 46 | 346 | 90 | 245 | 44 |
| M | 71 | 5 | 90 | 58 | 442 | 158 | 352 | 100 |

The non-sterile 2% bovine gelatin solution, denoted L, was obtained from "high bloom"-type gelatin after dissolution in purified water, homogenization by vortexing, and heating at 37° C. for 15 minutes, followed by further homogenization and, finally, cooling to room temperature.

The non-sterile 2% porcine gelatin solution, denoted M, was obtained from "high bloom"-type gelatin after dissolution in purified water, homogenization by vortexing, and heating at 37° C. for 15 minutes, followed by further homogenization and, finally, cooling to room temperature.

As illustrated in FIG. 12, the gels L and M have similar elastic moduli G'.

They also exhibit similar viscous moduli G".

As illustrated in FIG. 13, the resistance range of product M is twice as extensive as that of product L and it is also shifted translationally toward higher values of ζ, but significant overlap of the resistance ranges is preserved.

Also in FIG. 14, we see that the malleability range of product M is more extensive than that of product L.

These parameters make it possible, in particular, to complete the study of the behavior of gels L and M.

In conclusion, the method according to the invention has made it possible to evaluate and compare the rheological parameters of gelatin gels such as gels L and M.

The invention claimed is:

1. A method for evaluating the rheological properties of at least one gel, comprising determining the extent of the plastic domain in stress $\zeta_c - \zeta_p$ and in strain $\gamma_c - \gamma_p$, the determining being carried out according to the steps of:
   subjecting at least one sample of at least one gel to oscillatory mechanical stresses at a fixed frequency,
   determining and plotting the curves of the elastic modulus G' and of the viscous modulus G" as a function of the strain and of the stress,
   determining $\zeta_c$ and $\gamma_c$ at the point of intersection $X_c$ of the curves of G' and G" under stress and strain,
   determining $\zeta_p$ and $\gamma_p$ by fixing a value of G' (G'p), as the value for which the elastic modulus G' has decreased from 5 to 15% relative to the value of G' at the plateau of the linear domain, and that is defined as the entry value into the plastic domain, and calculating $\zeta_c-\zeta_p$ and $\gamma_c-\gamma_p$.

2. The method as set forth in claim 1, wherein the oscillatory mechanical stresses are implemented by means of an amplitude sweep.

3. The method as set forth in claim 2, wherein the amplitude sweep is a strain and/or stress sweep.

4. The method as set forth in claim 1, wherein the fixed frequency is between 0.1 and 10 Hz.

5. The method as set forth in claim 1, wherein the fixed frequency is equal to 1 Hz.

6. The method as set forth in claim 1, wherein the method is implemented through the use of a rheometer connected to a control unit for carrying out the measurements and the calculations.

7. The method as set forth in claim 1, wherein the gel is a hydrogel.

8. The method as set forth in claim 7, wherein the hydrogel consists of at least one polysaccharide selected from the group consisting of hyaluronic acid, heparosan, keratan, heparin, cellulose, cellulose derivatives, alginic acid, xanthan, carrageenan, chitosan, chondroitin, heparosan, and biologically acceptable salts thereof, alone or as a mixture.

9. The method as set forth in claim 1, wherein the gel consists of hyaluronic acid.

10. The method as set forth in claim 1, wherein the gel is an injectable gel.

11. A method for comparing and differentiating gels, comprising the steps of:

determining, according to the method of claim 1, the resistance range of gels, the resistance range being defined by the difference $\zeta_c-\zeta_p$, which is the extent of the plastic domain in stress, determining, according to the method of claim 1, the malleability of gels, the malleability range being defined by the difference $\gamma_c-\gamma_p$, which is the extent of the plastic domain in strain, and using the parameters defined above in order to compare and differentiate the gels.

* * * * *